Figure 1:
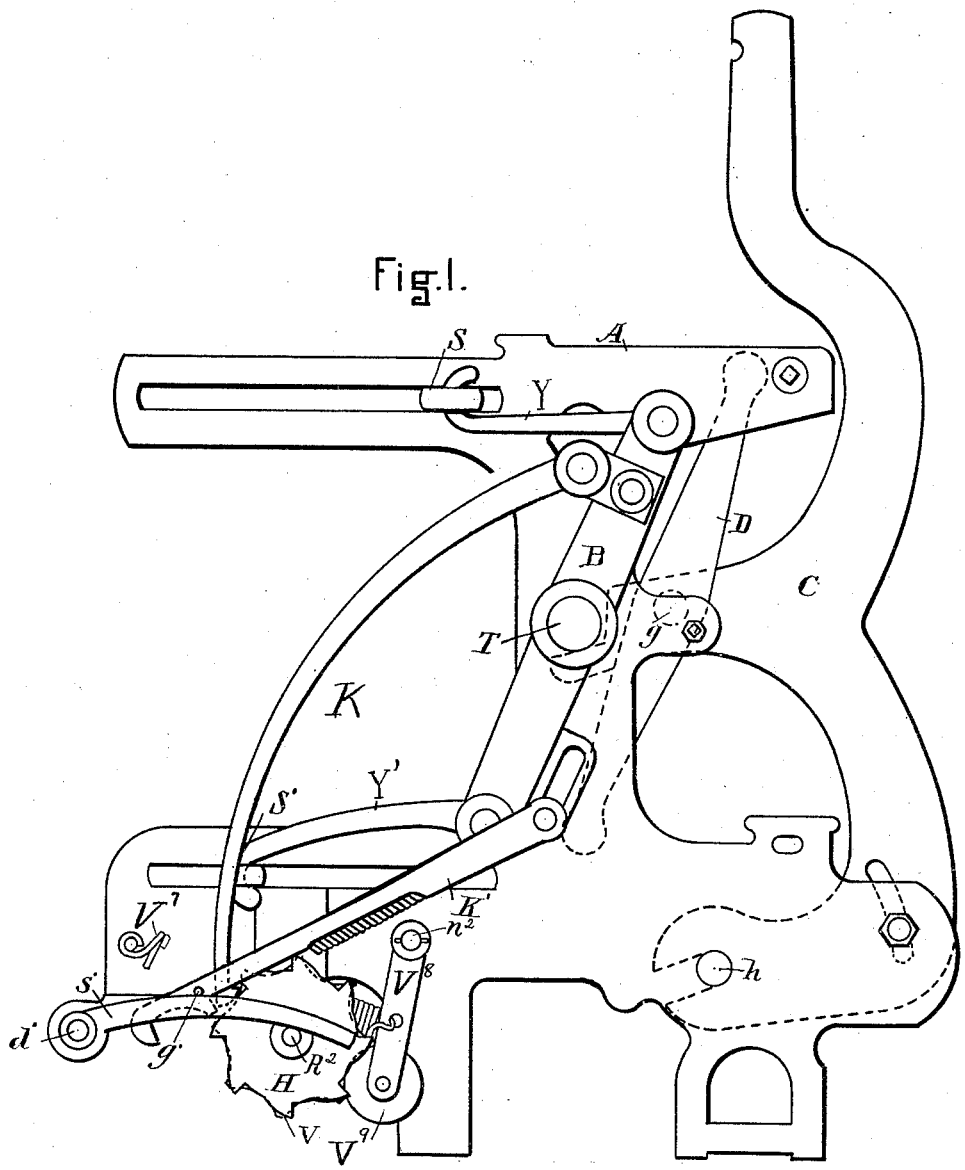

(No Model.) 4 Sheets—Sheet 1.

G. W. STAFFORD & W. EVANS.
PATTERN MECHANISM FOR LOOMS.

No. 466,873. Patented Jan. 12, 1892.

WITNESSES:
Albert L. Bodwell.
H. A. Shove.

INVENTORS
George W. Stafford
William Evans
By Benj Arnold ATTORNEY (No Model.) 4 Sheets—Sheet 2.
G. W. STAFFORD & W. EVANS.
PATTERN MECHANISM FOR LOOMS.

No. 466,873. Patented Jan. 12, 1892.

WITNESSES:
Albert L. Bodwell.
H. A. Shove.

INVENTORS
George W. Stafford
William Evans
By Benj Arnold ATTORNEY (No Model.) 4 Sheets—Sheet 3.
G. W. STAFFORD & W. EVANS.
PATTERN MECHANISM FOR LOOMS.

No. 466,873. Patented Jan. 12, 1892.

WITNESSES:
Albert L. Bodwell.
H. A. Shove.

INVENTORS
George W. Stafford
William Evans
By Benj. Arnold ATTORNEY

THE NORRIS PETERS CO., PHOTO-LITHO., WASHINGTON, D. C.

(No Model.) 4 Sheets—Sheet 4.
G. W. STAFFORD & W. EVANS.
PATTERN MECHANISM FOR LOOMS.
No. 466,873. Patented Jan. 12, 1892.
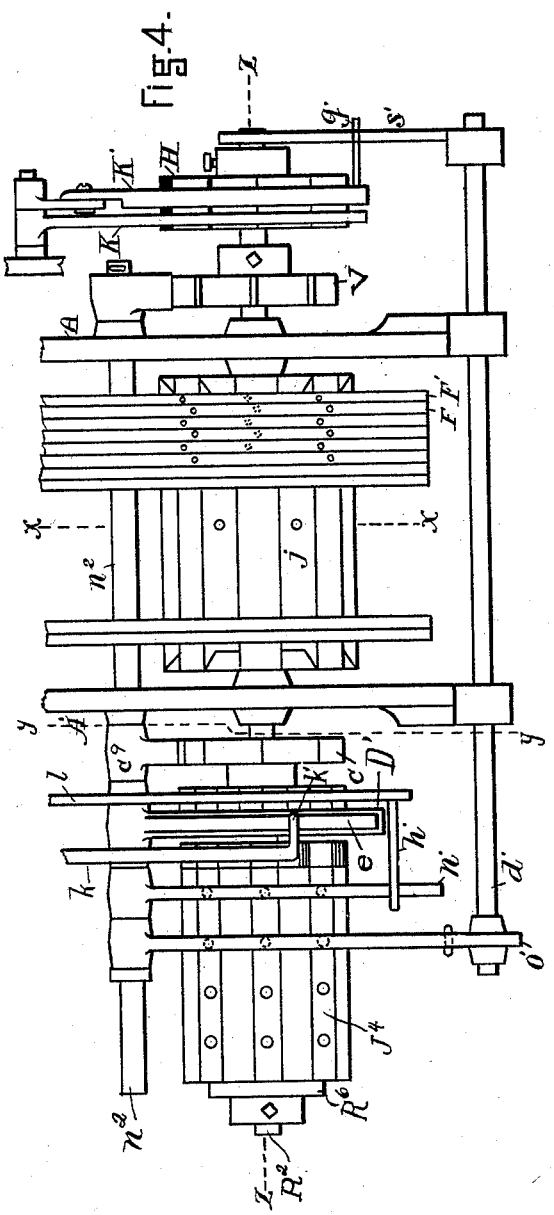
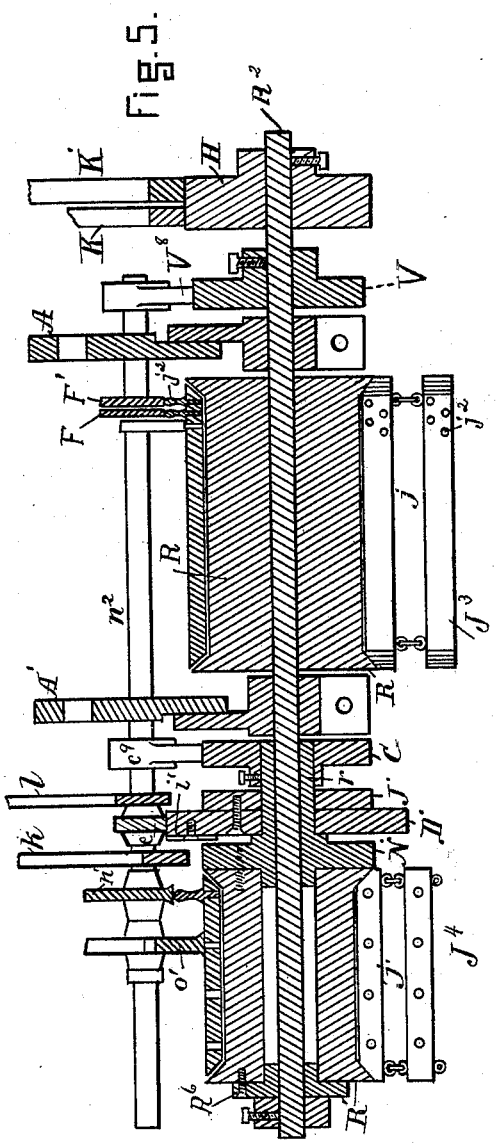
WITNESSES:
Albert L. Bodwell,
H. A. Shove.
INVENTORS
George W. Stafford
William Evans
By Berry Arnold ATTORNEY

UNITED STATES PATENT OFFICE.

GEORGE W. STAFFORD AND WILLIAM EVANS, OF PROVIDENCE, RHODE ISLAND.

PATTERN MECHANISM FOR LOOMS.

SPECIFICATION forming part of Letters Patent No. 466,873, dated January 12, 1892.

Application filed December 22, 1890. Serial No. 375,402. (No model.)

*To all whom it may concern:*

Be it known that we, GEORGE W. STAFFORD and WILLIAM EVANS, of Providence, in the county of Providence and State of Rhode Island, have invented certain new and useful Improvements in Pattern Mechanism for Looms; and we do hereby declare that the following is a full, clear, and exact description thereof, reference being had to the accompanying drawings, and to the letters of reference marked thereon, which form a part of this specification.

Our invention has particular relation to the pattern mechanism which is employed in looms for the purpose of determining the order in which the warps shall be shed in the weaving of a fabric.

The main object of our invention is to render unnecessary the use, in weaving certain classes of patterns, of the long, heavy, and cumbrous pattern-chains which heretofore generally have been employed. We accomplish this result by providing mechanism which enables us to utilize a pattern-chain having two sets of indicators representing two different patterns or parts of patterns arranged on the bars thereof, the successive lines of indicators pertaining to the two patterns or parts of patterns, respectively, being disposed upon the bars in a manner which will cause them to act alternately if the pattern-barrel, around which the pattern-chain passes, be actuated in the usual manner. Our devices enable us, in the first place, so to rotate the pattern-barrel as to present in proper order for successive action the lines of indicators pertaining to either the one or the other of the two patterns or parts of patterns aforesaid. They enable us, in the second place, after having woven a desired length of fabric of either pattern or part of pattern, to change from the latter to the other pattern or part of pattern and weave as long as may be desired from this pattern or part of pattern. They also enable us, in the third place, when it is desired so to do, to bring the successive lines of indicators pertaining to one pattern or part of pattern into action alternately with the successive lines of indicators pertaining to the other pattern or part of pattern. In consequence of the reduction of the length and weight of the pattern-chain which we effect we are enabled to weave some patterns which, from the length of chain required in weaving them by the use of the ordinary pattern mechanism, it would be impracticable to weave without the aid of our invention.

Our invention consists in an improved construction and combination of parts for imparting a movement of rotation to the pattern-barrel pertaining to the shedding mechanism of a loom and whereby the actuation of the said pattern-barrel is controlled in a manner to secure the results above specified, and it will first be described with reference to the accompanying drawings, and then be particularly pointed out in the claims at the close of this specification.

Figure 2:
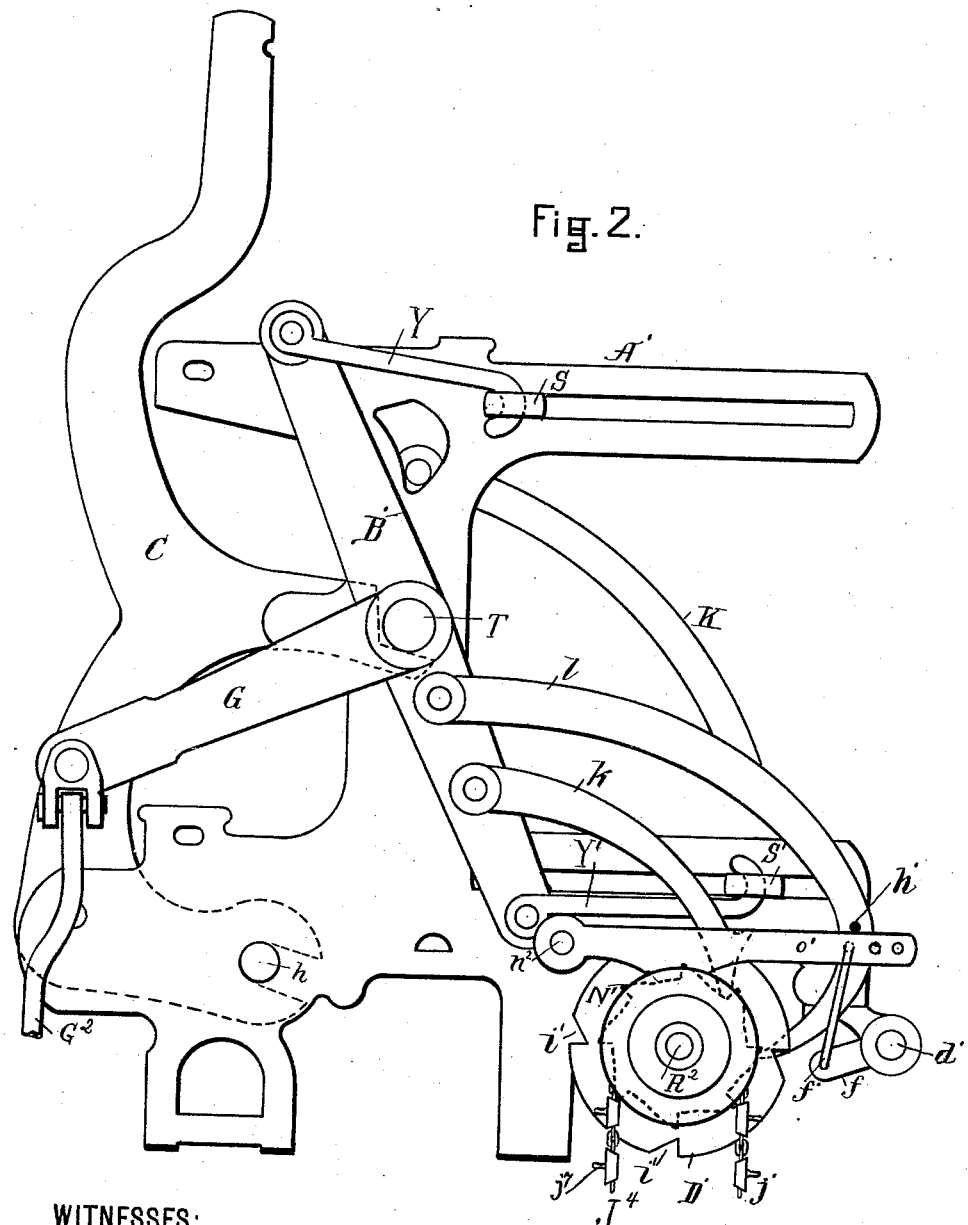
Figure 6:
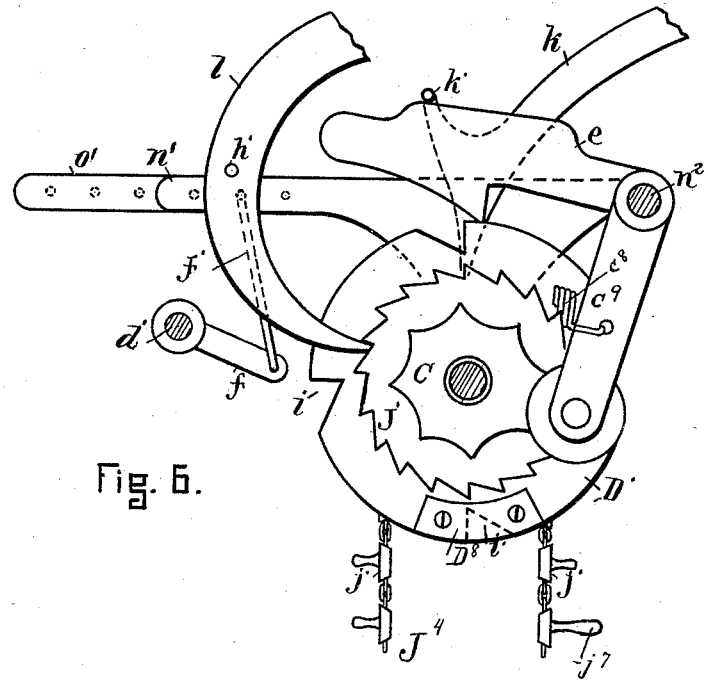
Figure 3:
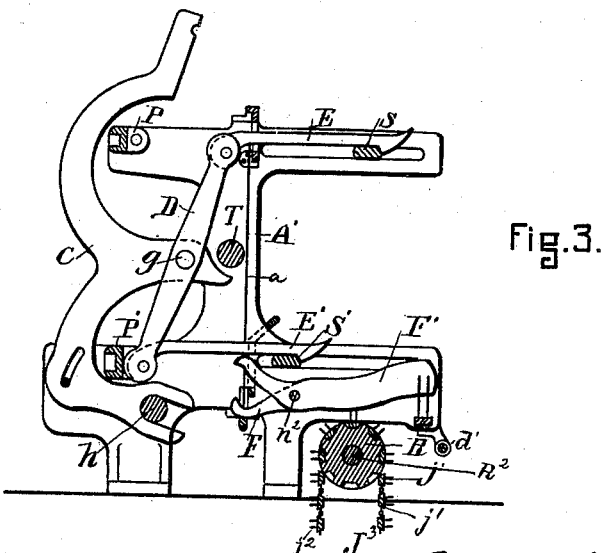

In the drawings, Figure 1 is a view in side elevation of a dobby for looms having our invention applied thereto, the view being of the side which is toward the front of the loom when the dobby is applied for use. Fig. 2 is a similar view showing the side of the dobby which is toward the rear of the loom. Fig. 3 is a view of a dobby in transverse section. Fig. 4 is a view in plan illustrative of our invention and showing the pattern-barrel of a dobby, indicator levers or fingers co-operating therewith, and devices embodying our invention for effecting and controlling the rotation of the said barrel. Fig. 5 is a view of the parts shown in Fig. 4, but showing the same in section on the line $z\ z$ in Fig. 4. Fig. 6 is a view of the devices at the left of the dotted line $y\ y$ in Fig. 4 and looking toward the left in the said Fig. 4.

In the accompanying drawings we have represented our invention as employed in connection with a well-known form of shedding mechanism for looms, which is known as a "dobby." Certain portions of the invention, however, are capable of being employed in connection with other forms of shedding mechanism as well.

In the said drawings, A A' are the side frames of the dobby.

C is one of the harness-levers, and is pivoted on a rod $h$, extending across from one side frame of the dobby to the other. D is the connector or jack-lever, which is pivoted at $g$ to the said harness-lever. E E' are the hooked jacks, which are pivoted to the opposite ends of the said connector or jack-lever D, and F F' are the indicator levers or fingers, sometimes called "plate-levers," which are pivoted side by side upon a rod $n^2$, mounted in the side frames A A', and are acted upon by the pins or indicators $j^2$, inserted in the bars $j'$ of the pattern-chain $J^3$, passing around the pattern-barrel R on the shaft $R^2$, the upper jack E having a wire $a$ interposed between it and the inner end of the corresponding indicator-lever F, while the lower jack E' rests upon the toe of the indicator-lever F'. There is a separate lever F or F' for every hooked jack E or E'.

S S' are the lifters, the opposite ends whereof are connected by rods Y Y' with the ends of the arms B and B', which are mounted on the rock-shaft T, the latter being supported in the side frames A A' and being provided with the arm G, that is connected, as usual, by the rod $G^2$ with a suitable moving part in the loom, the said shaft T being given in operation one complete reciprocation for every two picks of the loom, as is customary.

The shaft $R^2$ of the pattern-barrel R is provided, as usual, with a ratchet-wheel H and with a rest or locking-wheel V, and with the notches in the periphery of the said wheel V engages the roller $V^9$ on the arm $V^8$, which arm is pivoted on the end of rod $N^2$ and is acted upon by the spring $V^7$ so as to draw the said roller into the said notches. Ordinarily the said ratchet-wheel H is operated by means of a pawl such as that lettered K in the drawings, and which, like the latter, is pivoted to one of the arms B of the rock-shaft T, the said pawl operating to move the pattern-barrel forward one step at each alternate pick of the loom. In addition to the said pawl K we employ a second pawl K', which is pivoted to one of the arms B of the rock-shaft T, so as to act upon the ratchet-wheel H alternately with the pawl K, the said pawl K' being formed with two spurs or engaging portions, as shown, whereby when it is permitted to engage with the ratchet-wheel H it will operate at every other pick of the loom to move the pattern-barrel forward either one or two steps, according to the extent of its engagement with the teeth of the said wheel.

For the purpose of lifting the pawl K' so that it shall operate to move the pattern-barrel R forward to the extent of only one tooth at a time or so that it shall not engage at all with the ratchet-wheel H we insert into the side of the said pawl K' a pin $g'$ and provide a lifting-arm $s'$, which when moved upward raises with it the free end of the pawl. This lifting-arm $s'$ is mounted on the forward end of a rod $d'$, which is journaled in bearings in the side frames A A' and carries at its rear end an arm $f$, which is connected by a link $f'$ with the free extremity of an indicator-lever $o'$, that is pivoted on the rod $n^2$ and overhangs a pattern-barrel R', mounted to turn loosely on the rear end of the shaft $R^2$, the said end of shaft $R^2$ being extended rearwardly beyond the side frame A' for the purpose of receiving the said pattern-barrel R' and certain parts disposed adjacent thereto. The rod $n^2$ is also extended rearwardly beyond the side frame A' for the purpose of serving as a support to certain parts which are applied to it outside of the said frame.

To the bars $j'$ of the pattern-chain $J^4$, passing around the pattern-barrel R', are applied in line with the indicator-lever $o'$ pegs or pins $j^7$, intended to act upon the said indicator-lever and lift it when required for the purpose of partly turning the rod $d'$ and raising the lifting-arm $s'$. The pins or pegs $j^7$ are of two different lengths, as shown at the right in Fig. 6, the pins or pegs of the shorter length operating to raise the lifting-arm $s'$ sufficiently to prevent the pawl K' from moving the pattern-barrel more than one step forward at each engagement thereof and the pins or pegs of the greater length operating to raise the said arm, so as to lift pawl K' clear above the ratchet-wheel H and out of position for engagement therewith. The outer end of the pattern-barrel R' has applied thereto a collar $R^6$, turning upon the outer end of the shaft $R^2$, and at its inner end the pattern-barrel R' is connected with the sleeve $r$, also turning on the shaft $R^2$. To the sleeve $r$ is applied a ratchet-wheel N', which is engaged by the pawl $k$, connected with one of the arms B' at the corresponding end of the rock-shaft T. To the sleeve $r$ is applied also a notched rest or locking-wheel $c$, with which co-operates a roller on the locking-arm $c^9$, which is acted upon by the spring $c^8$. By its engagement with the ratchet-wheel N' pawl $k$ serves to rotate the pattern-barrel R'.

For the purpose of leaving the pattern-barrel R' stationary when no change is necessary in the position occupied by the lifting-arm $s'$ the engagement of the pawl $k$ with the ratchet-wheel N' is controlled by means of the devices which we shall now proceed to describe. The pawl $k$ is provided with a pin or projection $k'$, which overhangs the upper edge of the indicator-lever $e$, mounted on the rod $n^2$, the said indicator-lever having a projection thereon which bears against the periphery of the disk D'. In the periphery of the disk D', at suitable intervals, are formed notches $i'$, into which the projection of the indicator-lever $e$ may drop, and while the lever $e$ is in its lower position in consequence of its projection having entered a notch or depression in the said disk D' the pawl $k$ is permitted to engage with the ratchet-wheel N' and rotates the pattern-barrel R'. The disk D' has connected therewith a ratchet-wheel J, and the two are mounted to turn loosely on the sleeve $r$ at the side of the ratchet-wheel N', the ratchet-wheel J' being engaged by the pawl $l$, pivoted to the arm B'. The pawl $k'$ being a push-pawl and the pawl $l$ being a draw-pawl, these two pawls act alternately in occasioning the rotation of their ratchet-wheels, although both pawls are shown pivoted to the same actuating-arm. When it is desired that a notch $i$ in the disk D' shall not be entered by the lever $e$ when such notch is presented to the said lever, a plate $D^8$ (shown in Fig. 6) is screwed to the side of the disk D', so as to bridge the said notch and prevent the said lever $e$ from entering into the same. In order to occasion dwells in the rotation of the disk D', we provide the pawl $l$ with a stud or pin $h'$, which extends laterally over the indicator-lever $n'$, that is pivoted on the rod $n^3$ and rests upon the pattern-chain $J^4$. When a pin upon the said chain acts to raise the indicator-lever $n'$, the pawl $l$ is lifted out of engagement with the ratchet-wheel J'. It will be apparent that the rotation of the pattern-barrel R' is controlled by the disk D' and that in turn the rotation of disk D' is controlled by certain of the indicators on the pattern-chain $J^4$, passing around the pattern-barrel R'.

Reference being now had to the showing in Fig. 3, it is to be observed that in a dobby such as that which is shown and described—namely, one having an indicator lever or finger for each jack in both series of jacks—certain of the pins on each bar of the pattern-chain $J^3$ act to determine the engagement of the jacks of the upper series of jacks with the upper lifter and the remaining pins on each bar act in determining the engagement of the jacks of the lower series of jacks with the lower lifter; also, that if the pattern-barrel R is moved forward one step at each second pick of the loom one part of the pins on each bar will be permitted to indicate for the first of two given picks and the remaining part of the said pins will act for the second pick.

In general practice heretofore it has been found expedient to arrange the pins on each bar of the pattern-chain $J^3$ in two rows, one row of pins indicating for one pick and the other row indicating for the next pick, and ordinarily the first line of a pattern is indicated by the first line of pins on the first bar of the pattern-chain, the second line of the pattern by the second line of pins on the said bar, the third line of the pattern by the first line of pins of the second bar, the fourth line of the pattern by the second line of pins of the second bar, and so on throughout the chain. If now the pins are arranged as just stated and the pattern-barrel R is provided with devices for actuating it, such as we have described and shown, and the lifting-arm $s'$ is raised so as to hold pawl K' from engagement with the ratchet-wheel H, the pawl K alone will act to turn the pattern-barrel R', and this pawl will operate to move the said pattern-barrel forward one step at each second pick of the loom. The first row of pins upon the first bar of the pattern-chain $J^3$ will act at the first pick of the loom, the second row of pins upon the said bar will act at the second pick, the first row of pins upon the second bar will act at the third pick, the second row of pins upon the said bar will act at the fourth pick, and so on as usual and as above referred to. Again, if the arm $s'$ is depressed sufficiently far to permit the pawl K' to engage with the ratchet-wheel H and advance the pattern-barrel to the extent of one step at each engagement then in consequence of the alternate engagement of the pawls K and K' with the ratchet-wheel H the pattern-barrel will be moved a step forward at each pick of the loom. In this case at the first pick of the loom the first row of pins of the first bar of the pattern-chain will indicate, at the second pick the second row of pins upon the second bar of the pattern-chain will indicate, at the third pick the first row of pins upon the third bar will indicate, at the fourth pick the second row of pins upon the fourth bar will indicate, and so in the order which will be apparent from this statement. Again, should the arm $s'$ be lowered at one pick of the loom sufficiently to permit both of the spurs or projections on the pawl K' to engage with the ratchet-wheel H the pattern-barrel will be moved two steps forward in consequence of such engagement and one bar of the pattern-chain will be skipped. Thus the first bar of the pattern-chain being in position at the first pick, the pawl K', by its engagement with the ratchet-wheel H, will move the pattern-barrel forward sufficiently far to bring the third pattern-bar in position for acting at the second pick. Again, if when pawls K K' are acting alternately to move the pattern-barrel R one step at each pick of the loom the arm $s'$ is raised sufficiently to hold pawl K' entirely out of engagement with ratchet-wheel H for one pick of the loom one bar of the pattern-chain will be skipped also. It will now be understood that the pins upon the bars of the pattern-chain may be arranged in accordance with two different patterns or parts of patterns and that by controlling the engagement of the pawl K' with the ratchet-wheel H the pins of either one of said patterns or parts of patterns may be presented alternately to the indicator-levers. If pawls K and K' are allowed to act alternately, the latter pawl acting to move the pattern-barrel forward one step at each pick, the weaving will proceed in accordance with either the one or the other of the two patterns or parts of patterns on the pattern-chain. The effect of permitting the pawl K' to move the pattern-barrel forward two steps at one time and then resume its former action will be to change from the one pattern or part of pattern which at first was brought into action to the other, as will be obvious—that is to say, if the devices are in position to permit pawls K K' to act alternately and move the pattern-barrel forward one step for each pick of the loom the weaving will be from the first row of pins on the first bar of the pattern-chain, the second row of pins on the second bar of the pattern-chain, the first row of pins on the third bar of the pattern-chain, the second row of pins on the fourth bar of the pattern-chain, and so on in regular order; but when the regular action is interrupted by permitting pawl K' to move the pattern-barrel forward two steps at once at a given pick of the loom the order of procedure will be changed. Thus when pawl K is operated to bring forward a bar of the pattern-chain the warp-threads for the succeeding pick will be shed in the manner dictated by the first row of pins on the bar of the pattern-chain which is brought uppermost by this action of the pawl K. If now pawl K' is permitted to act to move the pattern-barrel forward two steps, as referred to, the third bar of the pattern-chain will be brought uppermost, and inasmuch as the lower lifter now becomes operative the disposition of the warps in the shed which is next formed will be in accordance with the dictates of the second row of pins upon the third bar, this second row of pins on the third bar pertaining to the other pattern or part of pattern upon the pattern-chain. The effect of lifting the pawl K' entirely out of action at one pick only will also be to change from one pattern or part of pattern to the other. This will be apparent if it is considered that by so lifting the said pawl out of action the bar of the pattern-chain which was brought uppermost by the preceding action of the pawl K will remain uppermost until the pawl K again acts—that is to say, it will remain uppermost for two picks and the two rows of pins upon the said bar, the one pertaining to the one pattern or part of pattern and the other pertaining to the other pattern or part of pattern, will be caused to come into action in immediate succession. In either case pawl K', having been permitted to move the pattern-barrel forward two steps at one time for one pick or having been thrown entirely out of action for one pick, upon the return of the said pawl to its former action the pattern-barrel will be moved forward again one step at each pick of the loom; but the lines of pins upon the bars of the pattern-chain will come into action in the new order instituted by the change. The effect of actuating the pattern-barrel by the pawl K alone, the pawl K' being lifted entirely out of action and caused to remain out of action, will be to cause the weaving to be carried on in accordance with the lines of each pattern alternately, and this will be apparent when it is remembered that then each bar of the pattern-chain will remain in action for two successive picks of the loom, one row of pins upon a bar acting to indicate prior to the outer movement of the upper lifter and the other row of pins thereon acting to indicate prior to the outward movement of the lower lifter.

It will be apparent from the foregoing that the construction and arrangement of parts are such as to enable us by the proper arrangement of the indicators upon the pattern-chain $J^4$ and by the employment of the disk D', having notches $i'$ properly disposed in the periphery thereof, to provide for continuing the weaving from one pattern or part of pattern as long as may be desired, for repeating the same as often as may be wished, and for then bringing the other pattern or part of pattern into action for any desired period; also, that the patterns may be woven in any desired order of succession or combination.

We do not lay claim herein to the particular devices herein shown and described whereby the rotation of the pattern-barrel R' is controlled.

We claim as our invention—

1. The combination, with a pattern-barrel and a ratchet-wheel connected with the said pattern-barrel, of two pawls which both enter into engagement with the teeth of the said ratchet-wheel to rotate the latter and the pattern-barrel, one of the said pawls having two spurs for engagement with the said teeth, means for actuating the respective pawls alternately at successive picks of the loom, and pattern devices whereby the engagement of the pawl having the two spurs with the teeth of the ratchet-wheel is controlled as desired, substantially as described.

2. The combination, with a harness-lever, a connector or jack-lever pivoted thereto, hooked jacks pivoted to the opposite ends of the said connector or jack-lever, lifters acting alternately, indicator fingers or levers, one of which is in operative relation with each of the said hooked jacks, a pattern-barrel, and a ratchet-wheel connected with the said pattern-barrel, of two pawls which both enter into engagement with the teeth of the said ratchet-wheel to rotate the latter and the pattern-barrel, one of the said pawls having two spurs for engagement with the said teeth, means for actuating the respective pawls alternately at the successive picks of the loom, and pattern devices whereby the engagement of the pawl having the two spurs with the teeth of the ratchet-wheel is controlled as desired, substantially as described.

3. The combination, with a pattern-barrel and a ratchet-wheel connected with the said pattern-barrel, of two pawls which both enter into engagement with the teeth of the said ratchet-wheel to rotate the latter and the pattern-barrel, means for actuating the respective pawls alternately at the succesive picks of the loom, a lifting-arm co-operating with one of the said pawls to determine its engagement with the teeth of the ratchet-wheel, an indicator lever or finger in operative connection with said lifting-arm, a pattern-chain having indicators which act against the said lever or finger, a second pattern-barrel, and actuating devices for said second pattern-barrel, substantially as described.

4. The combination, with a pattern-barrel and a ratchet-wheel connected with the said pattern-barrel, of two pawls which both enter into engagement with the teeth of the ratchet-wheel to rotate the latter and the pattern-barrel, one of said pawls having two spurs for engagement with the said teeth, means for actuating the respective pawls alternately at the successive picks of the loom, a lifting-arm co-operating with the said pawl having the two spurs, an indicator finger or lever in operative connection with the said lifting-arm, a pattern-chain having pins of two heights, a second pattern-barrel, and actuating devices for said second pattern-barrel, substantially as described.

5. The combination, with a harness-lever, a connector or jack-lever pivoted thereto, hooked jacks pivoted to the opposite ends of the said connector or jack-lever, lifters acting alternately, indicator fingers or levers, one of which is in operative relation with each of said hooked jacks, a pattern-barrel, and a ratchet-wheel connected with the said pattern-barrel, of two pawls which both enter into engagement with the teeth of the said ratchet-wheel to rotate the latter and the pattern-barrel, means for actuating the respective pawls alternately at the successive picks of the loom, a lifting-arm co-operating with one of the said pawls to determine its engagement with the teeth of the ratchet-wheel, an indicator finger or lever in operative connection with said lifting-arm, a pattern-chain having indicators which act against the said lever or finger, a second pattern-barrel, and actuating devices for said second pattern-barrel, substantially as described.

6. The combination, with a harness-lever, a jack-lever or connector pivoted thereto, hooked jacks pivoted to the opposite ends of the said jack-lever or connector, lifters acting alternately, indicator fingers or levers, one of which is in operative relation with each of said hooked jacks, a pattern-barrel, and a ratchet-wheel connected with the said pattern-barrel, of two pawls which both engage with the teeth of the said ratchet-wheel to rotate the latter and the pattern-barrel, one of said pawls having two spurs for engaging the said teeth, means for actuating the respective pawls alternately at the successive picks of the loom, a lifting-arm for controlling the engagement of the said pawl with two spurs with the teeth of the ratchet-wheel, an indicator-lever in operative connection with said lifting-arm, a pattern-chain, a second pattern-barrel, and actuating devices for said second pattern-barrel, substantially as described.

GEO. W. STAFFORD.
WILLIAM EVANS.

Witnesses:
CHARLES H. POLAND,
J. A. VICKERY.